Patented Mar. 25, 1930

1,751,685

UNITED STATES PATENT OFFICE

EDUARD DÖRR, OF ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ISOLATION OF BENZYL CELLULOSE

No Drawing. Original application filed September 20, 1926, Serial No. 136,723, and in Germany August 17, 1925. Divided and this application filed August 13, 1927. Serial No. 212,833.

In the benzylation of cellulose the crude benzyl cellulose is produced as a tough, gumlike mass containing benzyl alcohol and benzyl ether.

Hitherto, the working up of this crude product has been effected by extracting the reaction mass with solvents such as alcohol, ligroin and the like, which dissolve benzyl alcohol and benzyl ether, but not the benzyl cellulose.

On account of the above-mentioned consistency of the benzylated material this process is difficult of execution, large quantities of solvent being required in addition to the operation of kneading and involving a considerable loss of time. Moreover by this means the benzyl cellulose is only obtained completely free from benzyl alcohol and benzyl ether with the utmost difficulties.

The present invention concerns the production of benzyl celluloses of a high degree of purity and this new result is obtained with extreme ease by malaxating the tough, pasty mass for a short time with any water-soluble salt, preferably an alkali-metal-, or alkaline earth metal-, salt, until a moist friable mass becomes available, in which form the benzyl celluloses are most suitable for the extraction.

When this condition has been reached the benzyl alcohol and benzyl ether, but not the benzyl cellulose, are dissolved out quickly and easily by means of a solvent, such as alcohol, benzine and the like, according to one of the well known process, until the extraction liquid no longer contains any benzyl alcohol or benzyl ether. Since the crude benzyl cellulose is distributed throughout the mass in a finely divided form this extraction takes place in a comparatively short time. Thereupon the salt is washed out with water and the benzyl cellulose is dried. It is thus obtained as a white flocculent product.

According to an alternative method of working, the salt-containing mass is only extracted with solvent until, on washing out the intermixed salt, a flocculent product is obtained which no longer sticks together. This product, however, naturally still contains a certain quantity of benzyl alcohol and benzyl ether and the final extraction of these is effected at this stage. This manner of working is accompanied by an economy in solvents.

The following examples illustrate my invention:

*Example 1.*—1 kilogram of crude benzyl cellulose is well mixed with common salt (i. e., a commercial grade of sodium chloride) in amounts either equal or double by weight (or more or less) and then extracted with benzene in an extraction apparatus until the outflowing extraction liquid no longer contains any benzyl alcohol or benzyl ether. Thereupon the salt content of the mass is removed by washing with water.

*Example 2.*—1 kilogram of crude benzyl cellulose is malaxated with common salt in amounts either equal or double by weight (or more or less). When the mass has assumed a uniform consistency, 1 liter of alcohol is added and the kneading is continued for about ¼ to ½ hour, when the liquid is run off. If necessary the mass is extracted a second time with 1 liter of alcohol, after which the salt content is completely washed out with water and the final residues of benzyl alcohol and benzyl ether are then removed from the flocculent product with spirits.

The process can also be varied by alternately working with different solvents, for example first with benzine, then with ethyl alcohol, then with acetone and lastly with water.

The present application is a division of my co-pending application Ser. No. 136,723, filed Sept. 20, 1926.

I claim:

1. The improvement in the isolation of benzyl cellulose from crude reaction products containing the same, which comprises admixing said crude reaction products with common salt, extracting the resulting mixture with benzine, and removing the residual salt by means of washing with water.

2. The improvement in the isolation of benzyl cellulose from crude reaction products containing the same, which comprises admixing therewith common salt, alternately extracting the resulting mixture with benzine, alcohol and acetone, and removing the residual salt by means of washing with water.

In testimony whereof, I affix my signature.

EDUARD DÖRR.